US007786896B2

(12) United States Patent
Schmid et al.

(10) Patent No.: US 7,786,896 B2
(45) Date of Patent: Aug. 31, 2010

(54) PARKING ASSISTANCE SYSTEM AND PARKING ASSISTANCE METHOD

(75) Inventors: Dirk Schmid, Simmozheim (DE); Marcus Schneider, Ludwigsburg (DE); Wei-Chia Lee, Leonberg (DE); Gunther Schaaf, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 716 days.

(21) Appl. No.: 11/585,768

(22) Filed: Oct. 23, 2006

(65) Prior Publication Data

US 2007/0146164 A1 Jun. 28, 2007

(30) Foreign Application Priority Data

Oct. 21, 2005 (DE) ....................... 10 2005 050 576

(51) Int. Cl.
*B60Q 1/48* (2006.01)

(52) U.S. Cl. ..................... 340/932.2; 340/933; 340/436

(58) Field of Classification Search ............. 340/932.2, 340/933, 942, 943, 425.5, 435, 436, 438
See application file for complete search history.

(56) References Cited

U.S. PATENT DOCUMENTS 6,433,679 B1 * 8/2002 Schmid ...................... 340/435
6,683,539 B2 * 1/2004 Trajkovic et al. ......... 340/932.2
2005/0035879 A1 * 2/2005 Gotzig et al. ............ 340/932.2
2005/0062615 A1 * 3/2005 Braeuchle et al. ........... 340/903
2005/0122234 A1 * 6/2005 Danz et al. ............... 340/932.2
2006/0006988 A1 * 1/2006 Harter et al. ................ 340/435

FOREIGN PATENT DOCUMENTS

DE 198 47 013 4/2000

* cited by examiner

*Primary Examiner*—Toan N Pham
*Assistant Examiner*—Kerri McNally
(74) *Attorney, Agent, or Firm*—Kenyon & Kenyon LLP

(57) ABSTRACT

A parking assistance system for outputting parking instructions to the driver of a vehicle has a sensor device which is designed for performing a parking space measurement on the basis of parking space limits and generating parking space information on the basis of the parking space measurement; a program-controlled device which calculates the driving trajectory to be traveled on the basis of the parking space information generated and calculates a time to collision and/or a distance to collision, within which the vehicle will presumably collide with one of the parking space limits, from the parking space information generated and the calculated driving trajectory; and a warning signal transducer which generates a warning signal if the calculated period of time is less than a first limit value and/or the calculated distance to collision is less than a second limit value.

16 Claims, 5 Drawing Sheets

PARKING ASSISTANCE SYSTEM AND PARKING ASSISTANCE METHOD

FIELD OF THE INVENTION

The present invention relates to a parking assistance system and a parking assistance method for outputting parking instructions to the driver of a vehicle.

BACKGROUND INFORMATION

Increasing traffic density and increased construction on free surfaces are continuously restricting traffic space, in particular in population centers. Available parking space is limited and the search for a suitable parking space is an additional burden on the driver besides the ever-increasing traffic. Therefore, semiautonomous parking assistance systems (SPA) have been developed that are intended to assist the driver in parking. This relieves the driver of the decision as to whether a given parking space is sufficient for a parking maneuver.

A number of different of parking assistance systems are known, including, for example, parking assistance systems having a "parking space measurement" function (PSM) using sensors mounted on the side of the vehicle to measure a parking space as the vehicle drives by. If the system detects a parking space large enough for the vehicle, this is signaled to the driver. In the subsequent parking maneuver, the system provides the driver with instructions or warning signals for parking.

German Published Patent Application No. 198 47 013 describes such a parking assistance system having a parking space measurement function in which an analyzer unit compares a distance signal output by a sensor device with a distance limit value and a warning signal transducer generates a warning signal that corresponds to the remaining routing distance. The remaining distance from an obstacle (e.g., a parked vehicle, edge of the curb or the like) may thus be signaled to the driver.

One problem with this parking assistance system, however, is the great inertia in outputting the warning signal under some circumstances. In other words, since the parking assistance system operates based on distance, it may happen that the driver receives a warning just before coming in contact with an obstacle. This is the case when parking is done at a relatively high speed in particular, because the stopping distance may be greater than the remaining distance from the obstacle.

This problem occurs to an increased extent with "semiautonomous parking assistance systems having steering intervention." With such a system, the driver is relieved of the steering maneuver during the operation of parking the vehicle. The vehicle is steered automatically, so it automatically performs the steering intervention measures required for the parking maneuvers so that the driver need only accelerate and brake. However, experience has shown that such a facilitated parking maneuver results in the driver parking at a much higher speed because he is relying on a correct automatic turning of the steering wheel by the system and the associated collision avoidance. However, the stopping distance is much longer at a higher speed, so the inertia of the parking assistance system has an even more serious effect and the risk of collisions in the parking direction increases.

Another problem with many parking assistance systems is that under certain conditions the parking limit is not perceived by the parking assistance system. This may be the case in particular when the detection range of the sensors in the parking direction is too small, if the sensors are inactive or if there is some other external disturbance. In such a case, for lack of detection of the parking limit, it is impossible to calculate the distance remaining until collision, so there may not be a collision warning, which greatly increases the risk of a collision because the driver usually relies on such a warning.

SUMMARY OF THE INVENTION

Therefore, this parking assistance system for a vehicle, in particular for a motor vehicle, is provided for outputting parking instructions:

- having a sensor device which performs a parking space measurement on the basis of parking space limits and which generates parking space information as a function of the parking space measurements;
- having a program-controlled device which calculates a driving trajectory to be traveled by the vehicle for the parking maneuver on the basis of the parking space information thereby generated and which calculates a time to collision and/or a distance to collision within which the vehicle will presumably collide with one of the parking space limits, this calculation being based on the parking space information generated as well as the calculated driving trajectory; and
- having a warning signal transducer that generates a warning signal if the calculated time to collision is less than a first limit value and/or the calculated distance to collision is less than a second limit value.

A corresponding parking assistance method for outputting parking instructions for a vehicle includes the following steps:

(a) measuring a parking space on the basis of parking space limits and generating parking space information as a function of the parking space measurement;

(b) calculating a driving trajectory to be traveled by the vehicle for the parking maneuver on the basis of the parking space information thereby generated;

(c) calculating a time to collision or a distance to collision from the parking space information and the calculated driving trajectory, and (d) outputting a perceptible signal if the calculated time is less than (e) a first limit value, and/or the calculated distance to collision is less than a second limit value.

The idea on which the present invention is based is to utilize the information available from the parking space measurement for the collision warning. An important advantage derived from the system and the method according to the present invention is that such a parking assistance system need no longer rely exclusively on the collision warning using distance sensors which indicate the instantaneously measured distance from the parking space limit, but instead may still output a collision warning even if these instantaneous distance sensors are inactive or defective.

According to an advantageous refinement of the present invention, a memory device is provided in which the parking space information generated by the sensor device may be stored. Thus a completely model-based collision warning is possible, so that a collision warning may be output even if the distance sensors are inactive or defective (e.g., temporarily).

It is advantageous that a vehicle speed sensor linked to the program-controlled device is provided, measuring the instantaneous speed of the vehicle and outputting a vehicle speed signal corresponding to the instantaneous vehicle speed, and the program-controlled device for calculating the time to collision additionally takes into account the vehicle speed signal output by the vehicle speed sensor.

According to a preferred refinement of the present invention, a sensor device is provided for measuring the actual distance from the vehicle to a parking space limit. Thus a distance-based collision warning is also possible in addition to a speed-based collision warning.

It is advantageous that the program-controlled device has a comparator device that compares the parking space information generated with the information measured by the sensor device for measuring the actual distance of the vehicle from a parking space limit and, depending on the results, outputs a comparative signal indicating whether the sensor device for measuring the actual distance from a parking space limit is active or inactive. It is advantageous in particular that a status signal transducer is provided, which outputs a sensor status signal if the signal output by the comparator device indicates that the sensor device is not active. An inactive sensor device is understood here to refer to a sensor device which does not output suitable measurement signals. This may be the case, for example, if the sensor device is defective or if it is soiled or if there is other external interference, e.g., interference signals.

According to another advantageous embodiment, the warning signal transducer includes a display which outputs a visual warning signal having at least two levels of urgency and/or a loudspeaker which outputs an acoustic warning signal having at least two levels of urgency. Such acoustic and/or visual warning signals may also be output by devices already installed in the vehicle, e.g., a navigation device or loudspeakers. Various levels of urgency may signal to the driver how critical the parking situation is, i.e., how urgently braking should be performed.

It is advantageous in particular if the program-controlled device includes

- a first calculation device which calculates the time to collision on the basis of the parking space information generated by the sensor device for performing a parking space measurement;
- a second calculation device which calculates the distance to collision on the basis of the distance measured by the sensor device for measuring the actual distance from the parking space limit and
- an evaluation device which evaluates the time to collision and the distance to collision and outputs an urgency signal indicating the level of urgency corresponding to the time to collision and the distance to collision.

In this case, the program-controlled device ascertains (a) the time to collision on the basis of the parking space information generated by the sensor device for performing a parking space measurement and (b) the distance to collision on the basis of the distance measured by the sensor device for measuring the actual distance from the parking space limit. The program-controlled device then causes a perceptible signal to be generated by the warning signal transducer, its urgency level depending on whether the program-controlled device considers the time to collision or distance to collision thereby ascertained as being more critical.

This has the advantage that both speed-based collision warnings and distance-based collision warnings may be output.

The sensor device for implementing a parking space measurement typically includes near-range sensors, in particular ultrasonic sensors, for measuring the lateral distance of the vehicle from the parking space limit.

It is also advantageous that the program-controlled device includes a limit value determination device which determines the first limit value, taking into account the driver's response time and a speed-dependent stopping time. Such a dynamic determination of limit value makes it possible to take into account individual differences between response times of different drivers as well as the speed-dependent stopping time.

DETAILED DESCRIPTION

Figure 1:
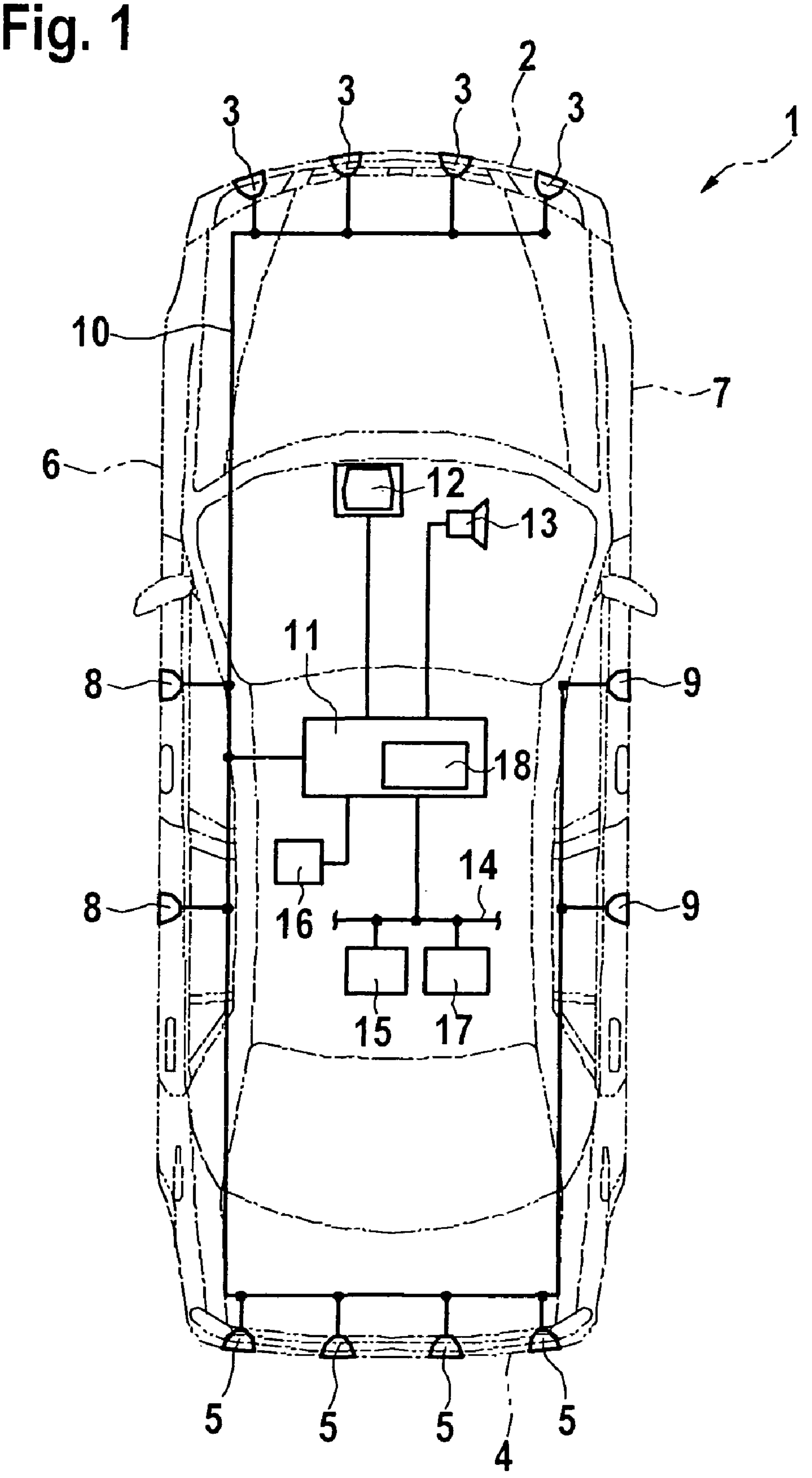
FIG. 1 shows a schematic diagram of a vehicle having a parking assistance system according to an embodiment of the present invention.

FIG. 1 schematically shows a vehicle having a parking assistance system according to one embodiment of the present invention.

FIG. 1 schematically shows a vehicle 1. Distance sensors 3 are provided on a front end 2 of the vehicle. Distance sensors 5 are also provided on a rear end 4 of the vehicle. Lateral distance sensors 8, 9 are provided on a left side 6 of the vehicle and on a right side 7 of the vehicle. The distance sensors measure distances from obstacles in the surroundings of the vehicle. Distance sensors 3, 5, 8, 9 are designed as ultrasonic sensors in particular. However, they may also measure distance based on a different measurement principle, e.g., visual signals or radar signals. Furthermore, video sensors which ascertain a distance from image information that has been recorded are also possible. Distance sensors 3, 5, 8, 9 supply their measured data or ascertained distance values over a data bus 10 to a program-controlled device 11 (e.g., a microprocessor or the like) having a memory 18 in vehicle 1. Program-controlled device 11 ascertains the distances from obstacles in the surroundings of the vehicle and the location of these obstacles in the surroundings of the vehicle. This is done in particular by analyzing and correlating the measured data of the individual sensors. Program-controlled device 11 may also operate the sensors in different measurement modes, e.g., the rate of a signal transmission is adapted to the particular vehicle speed. Thus the measurement conditions may be adjusted between measuring a parking space in driving past the parking space and in a parking maneuver which is generally executed more slowly. Program-controlled device 11 may thus determine a model of the environment of the vehicle on the basis of these distance values.

Furthermore, program-controlled device 11 is designed to ascertain a suitable parking space and determine a driving trajectory into this parking space. It also preferably determines outputs to the driver. For the purpose of this output, program-controlled device 11 is connected to a warning signal transducer, which may be designed as a display 12 and/or as a loudspeaker 13. Display 12 is in particular designed as a screen of a navigation display in the vehicle. Furthermore, instructions may also be output via a display in a combination instrument, via a heads-up display or LED displays, which are to be additionally mounted on the dashboard. In the present embodiment, the warning signal transducer is designed to be capable of outputting warning signals having three levels of urgency. Signals of different levels of urgency may be displayed on display 12 by warning bars of different colors. A warning signal of the lowest urgency level 3 may be represented by a green bar, for example, a warning signal of the next higher urgency level 2 may be represented by an additional yellow bar and a warning signal of the highest urgency level 1 may be represented by a red bar. In outputting the warning signals via loudspeaker 13, the various warning signals may be implemented by different loudness levels, by different frequencies of the signal tone, or by different intervals in the case of a pulsed tone.

To ascertain a movement of the vehicle, program-controlled device 11 is preferably connected to at least one speed sensor 15 via a data bus 14, in particular a CAN bus. In a preferred embodiment, speed sensor 15 is a wheel rpm sensor that measures a wheel movement of the vehicle. If a wheel movement is detected, the instantaneous speed of the vehicle is determined on the basis of the wheel rotation and the wheel circumference as well as the period of time. The distance traveled may be determined from the instantaneous speed of the vehicle in combination with the period of time. To be able to ascertain the direction of travel as well, program-controlled device 11 is also connected to a steering angle sensor 16 which may analyze the instantaneous steering direction of the vehicle. Whether the vehicle is traveling forward or is backing up may be ascertained in particular from a gear level position or from a setting of a transmission by a gear sensor 17.

In the present embodiment, program-controlled device 11 is designed to also determine the driver's response time. It compares in particular how rapidly the driver follows stopping instructions output via display 12 or loudspeaker 13 and ascertains therefrom the driver's response time Tr. It may preferably subdivide drivers into various categories, e.g., slow, normal and fast, and assign response times Tr to the drivers accordingly. However, it is also possible to measure response time Tr directly as time information and store it in memory 18.

Figure 2:
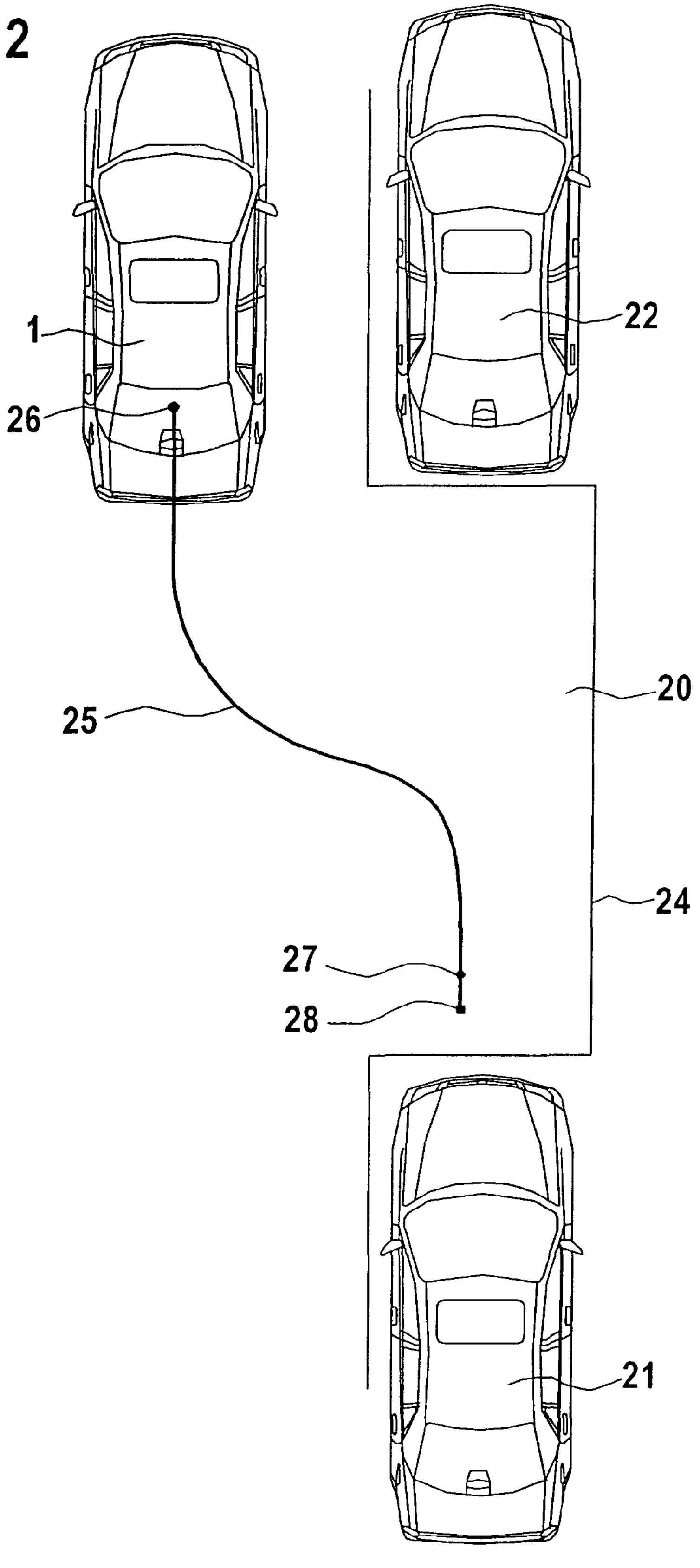
FIG. 2 shows a parking operation utilizing the parking assistance system according to the embodiment of the present invention.

FIG. 2 illustrates a parking maneuver utilizing the device for outputting parking instructions according to the embodiment. Vehicle 1, having the parking assistance system illustrated in FIG. 1, has previously driven past a first vehicle 21, parking space 20 and second vehicle 22 in the direction of arrow 23, during which time sensors 9 assigned to right side 7 of the vehicle were measuring the distance from vehicles 21, 22. In doing so, it has been found that parking space 20 between vehicle 21 and 22 is free and vehicle 1 could park there. A distance line 24 ascertained by sensors 9 indicates the dimensions ascertained by the sensors in driving past and is stored as parking space information in memory 18.

In the present embodiment, parking is performed using a semiautonomous parking assistance system having steering intervention, so that the driver need only accelerate and brake on his own after activating the parking assistance system, whereas the vehicle steers automatically. To this end, the program-controlled device 11 determines a driving trajectory 25 from current position 26 of vehicle 1 to parking position 27 into parking space 20 and determines steering angle settings that are automatically set by the parking assistance system while driving along this driving trajectory 25. This driving trajectory 25 is illustrated in FIG. 2 with regard to selected reference point 26, near the midpoint of the rear axle of the vehicle. In the simplest case, driving trajectory 25 is a straight segment, but usually, as in the case illustrated in FIG. 2, it is made up of a combination of straight segments, arcs of a circle or (depending on the steering angle settings) other curve segments.

It should be pointed out that for the sake of simplicity FIG. 2 depicts a situation in which vehicle 1 may be parked in one move. However, the present invention is equally applicable when the vehicle is parked in multiple maneuvers including forward and back-up segments. Furthermore, driving trajectory 25 may also be determined dynamically, i.e., an optimal trajectory 25 may be determined continuously from the model of the parking space stored in memory 18 and the current position of vehicle 1. This is the case in particular when it is a parking assistance system without steering intervention so the driver is prompted by acoustic or visual signals to set a suitable steering angle.

Program-controlled device 11 also determines a collision position 28 in which vehicle 1 will collide with vehicle 21. Collision position 28 is determined by extrapolating driving trajectory 25 from current position 26 to parking position 27 using the steering angle intended for the parking position and the reference point at which there will be a collision between vehicles 1 and 21 is determined.

The driver next initiates the parking operation. To do so, the driver operates the accelerator pedal of vehicle 1 so that the vehicle, steered automatically by the parking assistance system, is maneuvered into the parking space. Based on the measurement of the distance traveled and the measurement of the steering angle via steering angle sensor 16, program-controlled device 11 is aware at that time of which position vehicle 1 has assumed with respect to other vehicles 21, 22 and in particular with respect to parking space 20. Based on the position of vehicle 1, the parking assistance system gives the driver instructions (warning signals) during the parking procedure, instructing the driver to brake and stop the vehicle at a certain point in time.

Figure 3:
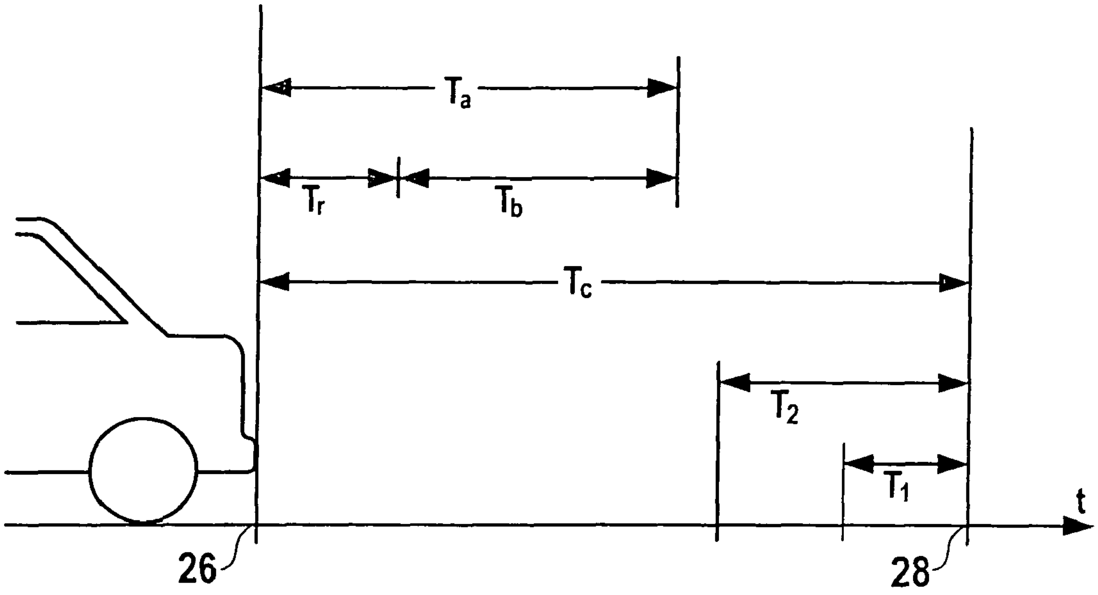
FIGS. 3(A) and 3(B) show diagrams which illustrate how the parking assistance system determines the warning level according to an embodiment of the present invention.
Figure 3:
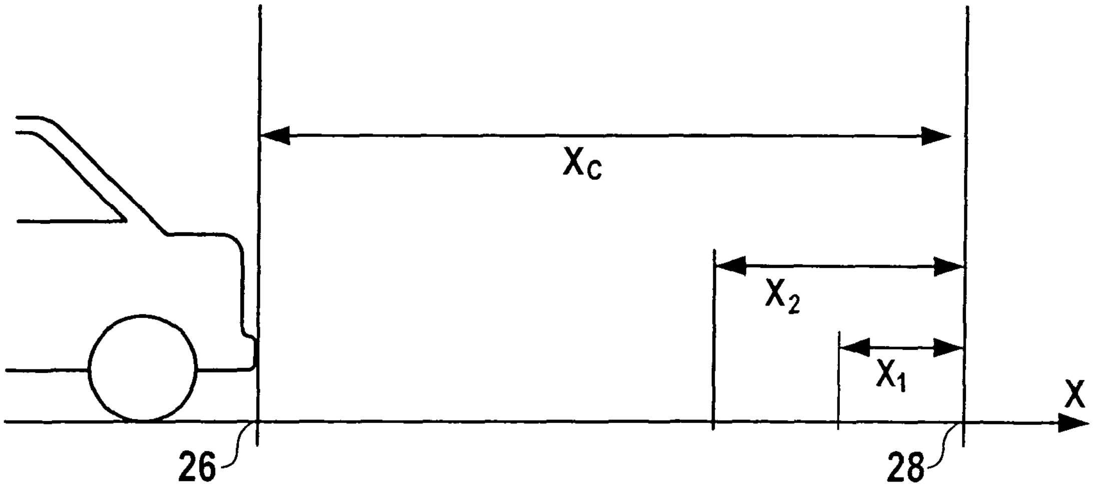

FIG. 3(A) shows a diagram illustrating how the parking assistance system ascertains suitable warning signals during the parking operation. Current position 26 of the vehicle is shown at the left on time axis t and collision position 28 (and/or points in time corresponding thereto) is shown on the right side.

Figure 4:
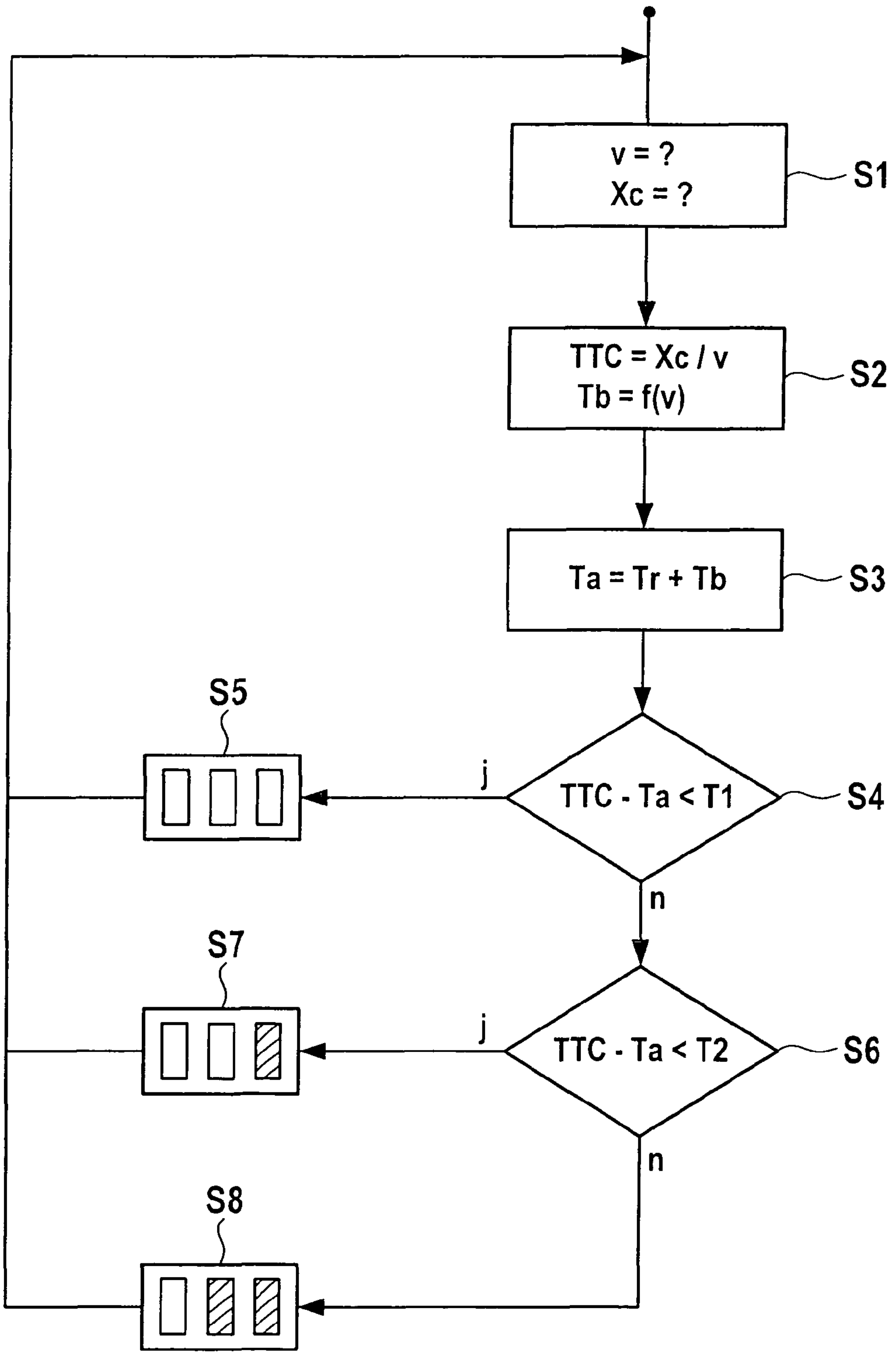
FIG. 4 shows a flow chart illustrating a method according to a first embodiment of the present invention.

FIG. 4 is a flow chart illustrating a method executed by the parking assistance system. It should be pointed out that only the information ascertained by sensors 8, 9 is processed for the method illustrated in FIG. 4 but not the information obtained from distance sensors 3, 5 on the front and rear ends. This method thus allows a functional parking assistance even when distance sensors 3 and 5 have little or no functionality.

After parking space (20) has been measured on the basis of parking space limits (24) in a step (not shown here) using distance sensors (9), and parking space information has been generated as a function of the parking space measurement, and driving trajectory (25) has been calculated therefrom, prevailing speed v of vehicle 1 is measured in step S1 and remaining distance to collision Xc to collision position 28 is determined. Prevailing speed v of vehicle 1 is determined using speed sensor 15. Remaining distance to collision Xc corresponds to the distance between current position 26 and collision position 28 on driving trajectory 25.

In step S2, program-controlled device 11 determines time TTC (time to collision) remaining until a collision with an obstacle (vehicle 21 here) occurs on given driving trajectory 25 at prevailing speed v. This time is also referred to below as the time to collision. Time to collision TTC is obtained from prevailing speed v and distance to collision Xc according to equation $TTC=Xc/v$. In step S2, presumed braking time Tb, which depends on the prevailing speed, is also determined.

Braking time Tb is understood here to refer to the period of time elapsing from the point in time when the braking operation is initiated to the point in time when vehicle 1 is stopped completely. The higher speed v of vehicle 1, the longer is braking time Tb. Braking time Tb for the prevailing speed may be read from a table stored in memory 18 or calculated by program-controlled device 11 on the basis of a suitable equation as a function of speed v. It is also possible to take into account the instantaneous acceleration in braking time Tb.

In step S3, program-controlled device 11 calculates stopping time Ta actually required for the stopping operation, of the sum of braking time Tb and driver's response time Tr, i.e., Ta=Tr+Tb, as shown in FIG. 3(A).

In step S4 program-controlled device 11 compares the difference between time to collision TTC and stopping time Ta with a predetermined time T1. If the difference between time to collision TTC and stopping time Ta is less than predetermined time T1 (i.e., TTC−Ta<T1), then in step S5 a warning signal of the (highest) urgency level 1 is output, whereupon the procedure returns to step S1. In the present embodiment, the warning signals are output on display 12 having three warning bars. In steps S5, S7 and S8, the white rectangles correspond to active (i.e., flashing) warning bars and shaded rectangles correspond to inactive (i.e., not flashing) warning bars. As illustrated in FIG. 3(A), urgency level 1 corresponds to the case in which only a slight clearance remains until collision when a stopping operation has been initiated immediately, which is why the driver is instructed by a warning signal of the highest urgency level 1 to brake and stop immediately.

If the difference ascertained in step S4 is not less than predetermined time T1 then the procedure jumps to step S6. In step S6, program-controlled device 11 compares the difference between time to collision TTC and stopping time Ta with a predetermined time T2. If the difference between time to collision TTC and stopping time Ta is less than predetermined time T2 (i.e., TTC−TA<T2), then in step S7, a warning signal of the (medium) urgency level 2 is output whereupon the procedure returns to step S1. As depicted in FIG. 3(A), this corresponds to the case in which a moderate amount of clearance (namely at least T1 and at most T2) until a collision remains when the stopping operation is initiated immediately, which is why the driver is instructed by a warning signal of a medium urgency level 2 to prepare for the braking operation.

If the difference ascertained in step S6 is not less than predetermined time T2, then the procedure jumps to step S8. In step S8, a warning signal of the (lowest) urgency level 3 is output, whereupon the procedure returns to step S1. As depicted in FIG. 2, this corresponds to the case in which enough clearance remains (namely at least T2) until a collision when a stopping operation is initiated at this point in time. Instead of a warning signal of the lowest urgency level 3 it is also possible not to output any warning signal at all or to output a continuous signal (e.g., a continuously green LED warning bar for urgency level 3, an additional yellow warning bar for urgency level 2 and again another additional bar for urgency level 1).

The method implemented by the parking assistance system of this embodiment has the advantage that even without an additional sensor (i.e., an additional rear end sensor), for example, a very early collision warning is made possible. In particular in parking at a high speed, a prompt collision warning may thus be output.

Another advantage is that a collision warning may also be issued when the sensors (here, i.e., the rear-end sensors and front-end sensors) used for the actual distance measurement are inactive (or defective) or are supplying a signal that is too weak, e.g., because of soiling.

Another advantage is that the output of model-based collision warnings using a parking assistance system of the present embodiment may take place in the same way (i.e., using the same visual or acoustic signals) as in the case of a parking assistance system that outputs collision warnings based on measurement of the current distance. Therefore, no learning phase is necessary for the user (driver).

Figure 5:
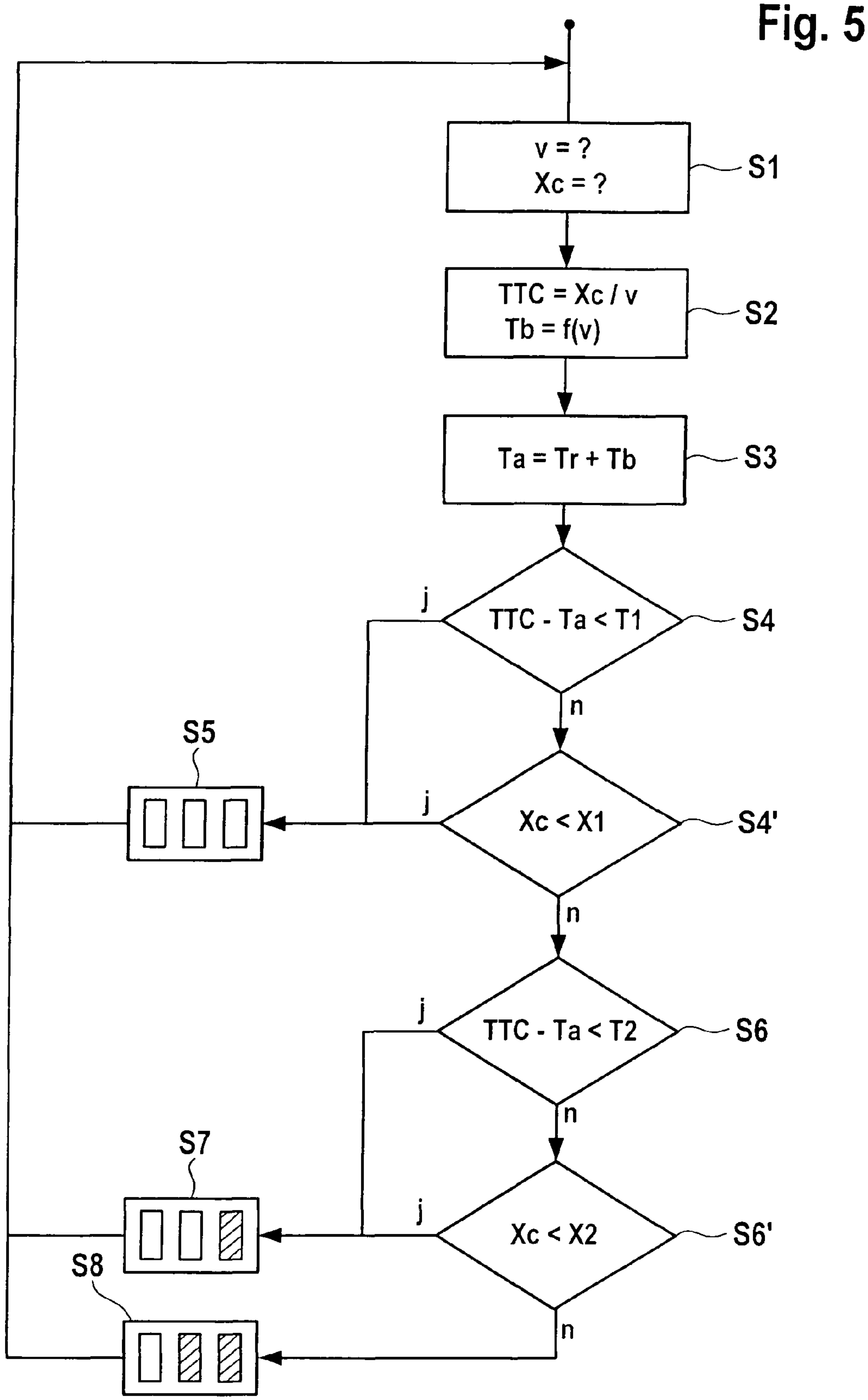
FIG. 5 shows a flow chart which illustrates a method according to a second embodiment of the present invention.

FIG. 5 shows a flow chart which describes a method according to a second embodiment of the present invention. In this method according to the second embodiment of the present invention, a collision warning based on the distance actually measured is also output in addition to the model-based collision warning. The warning signal output by the warning signal transducer thus depends on whether the remaining Xc or remaining time to collision TTC is "more critical." This is explained in greater detail below.

The flow chart in FIG. 5 is essentially identical to the flow chart in FIG. 4, but it includes two additional steps S4' and S6'. Steps that are identical or correspond to those in the flow chart in FIG. 4 are not described in greater detail below.

If the difference ascertained in step S4 is not less than predetermined time T1, the procedure jumps back to step S4', where a check of the remaining distance to collision is performed. If remaining distance to collision Xc is less than a predetermined distance X1 in step S4', the procedure jumps back to step S5 in which a warning signal of the (highest) urgency level 1 is output, after which the procedure jumps back to step S1. As shown in FIG. 3(B), this corresponds to the case when only a small amount of clearance remains until the collision in the case of a stopping procedure initiated immediately, which is why the driver is instructed by a warning signal of the highest urgency level 1 to brake immediately.

If in step S4' distance to collision Xc is greater than predetermined distance X1, then the procedure jumps to step S6, where the comparison described above between time to collision TTC and stopping time Ta is performed.

If the difference ascertained in step S6 is not less than predetermined time T2, the procedure jumps back to step S6', where a check of the remaining distance to collision is again performed. If the remaining distance to collision Xc in step S6' is less than a predetermined distance X1, a warning signal of (medium) urgency level 2 is output in step S7, after which the procedure returns to step S1. As depicted in FIG. 3(B), this corresponds to the case when there remains a moderate amount of clearance (namely at least X1 and at most X2) until a collision when a stopping operation is initiated immediately, which is why the driver is instructed by a warning signal of medium urgency level 2 to prepare for the braking operation.

Finally, in step S8, a warning signal of the (lowest) urgency level 3 is output, whereupon the procedure returns to step S1. As depicted in FIGS. 3(A) and 3(B), this corresponds to the case in which enough clearance remains (namely at least T2 and/or X2) until a collision when a stopping operation is initiated at this point in time.

In addition to the advantages of the first embodiment, the method according to this second embodiment has the advantage that both speed-based collision warnings and distance-based collision warnings may be output. A concrete example of the sequence of this method is that the driver very promptly drives into the parking space so that a warning of urgency level 1 is output on the basis of the TTC calculation, although actual distance Xc to the obstacle (which at this point in time may perhaps not yet be detected by the rear-end sensors) is even greater than distance X2. Based on the warning, the driver brakes, so that a noncritical distance is again displayed by the parking assistance system. The driver then approaches the obstacle at a lower speed and when the distance between the vehicle and the obstacle amounts to only X2 or X1, the parking assistance system outputs warning signals at urgency levels 2 or 1 accordingly.

In the method according to the second embodiment, it is also possible to vary the warning signal (e.g., by varying its tone in the case of an acoustic signal) depending on whether the warning signal is output because of an obstacle detected at this moment (e.g., by rear-end sensors) or on the basis of a "virtual" or model-based obstacle detected during the parking space measurement (e.g., by side sensors). This makes it possible for the driver to evaluate on the basis of which sensors a warning signal is output and optionally whether the warning signal is speed-based or distance based.

What is claimed is:

1. A parking assistance system of a motor vehicle for outputting parking instructions, comprising:

a sensor device that performs a parking space measurement on the basis of parking space limits and generates parking space information as a function of the parking space measurement;

a program-controlled device which calculates a driving trajectory to be traveled by the vehicle for a parking maneuver on the basis of the parking space information generated and calculates a time to collision and/or a distance to collision within which the vehicle will presumably collide with one of the parking space limits, basing this calculation on the parking space information generated as well as on the calculated driving trajectory;

a warning signal transducer that generates a warning signal if the calculated time to collision is less than a first limit value and/or the calculated distance to collision is less than a second limit value; and a second sensor device for measuring an actual distance from the vehicle to at least one of the parking space limits;

wherein the program-controlled device includes a comparator device to compare the parking space information generated with information measured by the second sensor device for measuring the actual distance of the vehicle from a parking space limit and, as a function thereof, output a comparative signal indicating whether the second sensor device for measuring the actual distance from a parking space limit is active, wherein the warning signal transducer contains a display which outputs a visual warning signal having at least two urgency levels and/or a loudspeaker that outputs an acoustic warning signal having at least two urgency levels, wherein the program-controlled device includes:

a first calculation unit to calculate the time to collision on the basis of the parking space information generated by the sensor device for implementing a parking space measurement, a second calculation device to calculate the distance to collision on the basis of the actual distance measured by the second sensor device for measuring the actual distance from the parking space limit, and an evaluation device to evaluate the time to collision and the distance to collision and outputs an urgency signal that corresponds to the time to collision and the distance to collision and has the corresponding urgency level.

2. The parking assistance system as recited in claim 1, further comprising:

a memory unit in which the parking space information generated by the sensor device is storable.

3. The parking assistance system as recited in claim 1, further comprising:

a vehicle speed sensor which is connected to the program-controlled device, and which measures a current vehicle speed of the vehicle and outputs a vehicle speed signal corresponding to the current vehicle speed, and the program-controlled device additionally takes into account the vehicle speed signal output by the vehicle speed sensor to calculate the time to collision.

4. The parking assistance system as recited in claim 1, further comprising:

a status signal transducer, which outputs a sensor status signal if the signal output by the comparator device indicates that the second sensor device for measuring the actual distance from a parking space limit is not active.

5. The parking assistance system as recited in claim 1, wherein the sensor device has near-range sensors corresponding to ultrasonic sensors, for measuring a lateral distance of the vehicle from at least one of the parking space limits.

6. The parking assistance system as recited in claim 1, wherein the program-controlled device includes a limit value determination device which determines the first limit value, taking into account a response time of a driver and a speed-dependent stopping time.

7. The parking assistance system as recited in claim 1, further comprising:

a memory unit in which the parking space information generated by the sensor device is storable;

a vehicle speed sensor which is connected to the program-controlled device, and which measures a current vehicle speed of the vehicle and outputs a vehicle speed signal corresponding to the current vehicle speed, and the program-controlled device additionally takes into account the vehicle speed signal output by the vehicle speed sensor to calculate the time to collision; and a status signal transducer, which outputs a sensor status signal if the signal output by the comparator device indicates that the sensor device for measuring the actual distance from a parking space limit is not active.

8. The parking assistance system as recited in claim 7, wherein the sensor device has near-range sensors corresponding to ultrasonic sensors, for measuring a lateral distance of the vehicle from at least one of the parking space limits, and wherein the program-controlled device includes a limit value determination device which determines the first limit value, taking into account a response time of a driver and a speed-dependent stopping time.

9. A non-transitory computer readable medium having a computer program, which is executable by a processor, comprising:

a computer code arrangement having computer code for outputting parking instructions for a motor vehicle, by performing the following:

measuring a parking space on the basis of parking space limits and generating parking space information as a function of the parking space measurement;

calculating a driving trajectory to be traveled by the vehicle for a parking maneuver on the basis of the parking space information generated;

calculating a time to collision or a distance to collision from the parking space information and the calculated driving trajectory;

outputting a warning signal if the calculated period of time is less than a first limit value and/or the calculated distance to collision is less than a second limit value;

measuring an actual distance from the vehicle to at least one of the parking space limits;

comparing the parking space information generated with the actual distance measured;

outputting a comparative signal as a function of the comparison between the parking space information and the actual distance indicating whether the measurement of the actual distance is suitable;

measuring a current vehicle speed of the vehicle;

outputting a vehicle speed signal corresponding to the current vehicle speed; and calculating the time to collision based on the vehicle speed signal.

10. A non-transitory computer readable medium of claim 9, further comprising:

outputting a sensor status signal if the comparative signal indicates that the measurement of the actual distance is unsuitable.

11. A non-transitory computer readable medium of claim 9, further comprising:

outputting a visual warning signal having at least two urgency levels.

12. A non-transitory computer readable medium of claim 9, further comprising:

measuring a lateral distance of the vehicle from at least one of the parking space limits.

13. A non-transitory computer readable medium of claim 9, further comprising:

determining the first limit value based on a response time of a driver and a speed-dependent stopping time.

14. A non-transitory computer readable medium of claim 9, further comprising:

outputting a sensor status signal if the comparative signal indicates that the measurement of the actual distance is unsuitable; and outputting a visual warning signal having at least two urgency levels.

15. A non-transitory computer readable medium of claim 9, further comprising:

calculating the time to collision based on the parking space information generated;

calculating the distance to collision based on the actual distance measured;

evaluating the time to collision and the distance to collision;

outputting an urgency signal that corresponds to the time to collision and the distance to collision, the urgency signal having a corresponding urgency level;

measuring a lateral distance of the vehicle from at least one of the parking space limits; and determining the first limit value based on a response time of a driver and a speed-dependent stopping time.

16. A non-transitory computer readable medium having a computer program, which is executable by a processor, comprising:

a computer code arrangement having computer code for outputting parking instructions for a motor vehicle, by performing the following:

measuring a parking space on the basis of parking space limits and generating parking space information as a function of the parking space measurement;

calculating a driving trajectory to be traveled by the vehicle for a parking maneuver on the basis of the parking space information generated;

calculating a time to collision or a distance to collision from the parking space information and the calculated driving trajectory;

outputting a warning signal if the calculated period of time is less than a first limit value and/or the calculated distance to collision is less than a second limit value;

measuring an actual distance from the vehicle to at least one of the parking space limits;

comparing the parking space information generated with the actual distance measured;

outputting a comparative signal as a function of the comparison between the parking space information and the actual distance indicating whether the measurement of the actual distance is suitable;

calculating the time to collision based on the parking space information generated;

calculating the distance to collision based on the actual distance measured;

evaluating the time to collision and the distance to collision; and outputting an urgency signal that corresponds to the time to collision and the distance to collision, the urgency signal having a corresponding urgency level.

* * * * *